US011706622B1

(12) United States Patent
Carroll (10) Patent No.: US 11,706,622 B1
(45) Date of Patent: *Jul. 18, 2023

(54) METHODS, SYSTEMS, AND MEDIA FOR PROTECTED NEAR-FIELD COMMUNICATIONS

(71) Applicant: McAfee, LLC, San Jose, CA (US)

(72) Inventor: Eoin Carroll, Midleton (IE)

(73) Assignee: McAfee, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/828,856

(22) Filed: May 31, 2022

Related U.S. Application Data (63) Continuation of application No. 16/744,888, filed on Jan. 16, 2020, now Pat. No. 11,375,371.

(60) Provisional application No. 62/955,709, filed on Dec. 31, 2019.

(51) Int. Cl.
  *H04L 12/06* (2006.01)
  *H04W 12/069* (2021.01)
  *H04W 12/033* (2021.01)
  *H04W 12/50* (2021.01)
  *H04L 9/40* (2022.01)

(52) U.S. Cl.
  CPC ........... *H04W 12/069* (2021.01); *H04L 63/04* (2013.01); *H04W 12/033* (2021.01); *H04W 12/50* (2021.01)

(58) Field of Classification Search
  CPC ............................... H04L 63/04; H04W 12/50
  See application file for complete search history.

(56) References Cited

U.S. PATENT DOCUMENTS

| | | | | |
|---|---|---|---|---|
| 10,229,845 | B2* | 3/2019 | Hyon | F27B 3/02 |
| 10,453,280 | B2* | 10/2019 | Kontturi | G07C 9/28 |
| 10,504,179 | B1* | 12/2019 | McGuire | G06Q 40/04 |
| 2004/0083368 | A1* | 4/2004 | Gehrmann | H04L 9/3242 713/171 |
| 2008/0167003 | A1* | 7/2008 | Wang | H04W 24/02 455/411 |
| 2015/0339662 | A1* | 11/2015 | Huang | G06Q 20/363 705/67 |

(Continued)

OTHER PUBLICATIONS

Notice of Allowance dated Feb. 16, 2022 in U.S. Appl. No. 16/744,888, pp. 2-19.

(Continued)

*Primary Examiner* — William S Powers
(74) *Attorney, Agent, or Firm* — Byrne Poh LLP (57) ABSTRACT

Methods, systems, and media for protected near-field communications are provided. In some embodiments, the method comprises: receiving, from an NFC tag device, a request for an NFC reader device identifier (ID); transmitting the NFC reader device ID to the NFC tag device; receiving an NFC tag device ID; determining whether the NFC tag device ID matches an NFC tag device ID stored in memory of the NFC reader device; in response to determining that the NFC tag device ID matches the NFC tag device ID, transmitting a password to the NFC tag device; receiving, from the NFC tag device, a shared secret; determining whether the received shared secret matches a shared secret stored in the memory of the NFC reader device; and in response to determining that the received shared secret matches the shared secret, causing an action to be performed by a device associated with the NFC reader device.

21 Claims, 3 Drawing Sheets

(56) References Cited

U.S. PATENT DOCUMENTS

2017/0109735 A1* 4/2017 Sheng ............... G06Q 20/3678
2018/0135337 A1* 5/2018 Johnson ............... H04N 7/181

OTHER PUBLICATIONS

NXP Semiconductors, "NTAG213/215/216 NFC Forum Type 2 Tag compliant IC with 144/504/888 bytes user memory", Data Sheet, Jun. 2, 2015, pp. 1-60.

* cited by examiner

METHODS, SYSTEMS, AND MEDIA FOR PROTECTED NEAR-FIELD COMMUNICATIONS

CROSS REFERENCE TO RELATED APPLICATION

This application is a continuation of U.S. patent application Ser. No. 16/744,888, filed Jan. 16, 2020, which claims the benefit of U.S. Provisional Application No. 62/955,709, filed Dec. 31, 2019, each of which is hereby incorporated by reference herein in its entirety.

TECHNICAL FIELD

The disclosed subject matter relates to methods, systems, and media for protected near-field communications.

BACKGROUND

Users are increasingly using devices that use Near Field Communications (NFC) to perform actions, such as unlocking doors, making payments, etc. For example, a user may have an NFC tag (e.g., a wearable device, a badge, a phone, etc.) that, when brought within proximity to an NFC reader, allows the NFC tag to transmit information to the NFC reader to perform an action, such as unlocking a door. However, NFC devices can present potential security problems. For example, because an NFC tag typically transmits identifying information to any NFC reader brought within proximity of the NFC tag, it can be easy to retrieve an identifier of an NFC tag, and the NFC tag can then be cloned using the identifier of the NFC tag. In some cases, by cloning an NFC tag, a malicious actor can, for example, use the cloned NFC tag to enter a person's house.

Accordingly, it is desirable to provide methods, systems, and media for methods and apparatus for protected near-field communications.

SUMMARY

Methods, systems, and media for protected near-field communications are provided.

In accordance with some embodiments of the disclosed subject matter, a method for protected near-field communications is provided, the method comprising: receiving, from an NFC tag device, a request for an NFC reader device identifier (ID); in response to receiving the request, transmitting the NFC reader device ID to the NFC tag device; receiving, by an NFC reader device, an NFC tag device ID; determining whether the NFC tag device ID matches an NFC tag device ID stored in memory of the NFC reader device; in response to determining that the NFC tag device ID matches the NFC tag device ID stored in the memory of the NFC reader device, transmitting a password to the NFC tag device; receiving, from the NFC tag device, a shared secret; determining whether the received shared secret matches a shared secret stored in the memory of the NFC reader device; and in response to determining that the received shared secret matches the shared secret stored in the memory of the NFC reader device, causing an action to be performed by a device associated with the NFC reader device.

In accordance with some embodiments of the disclosed subject matter, a system for protected near-field communications is provided, the system comprising: a memory; and a hardware processor coupled to the memory that is programmed to: receive, from an NFC tag device, a request for an NFC reader device identifier (ID); in response to receiving the request, transmit the NFC reader device ID to the NFC tag device; receive, by an NFC reader device, an NFC tag device ID; determine whether the NFC tag device ID matches an NFC tag device ID stored in memory of the NFC reader device; in response to determining that the NFC tag device ID matches the NFC tag device ID stored in the memory of the NFC reader device, transmit a password to the NFC tag device; receiving, from the NFC tag device, a shared secret; determine whether the received shared secret matches a shared secret stored in the memory of the NFC reader device; and in response to determining that the received shared secret matches the shared secret stored in the memory of the NFC reader device, cause an action to be performed by a device associated with the NFC reader device.

In accordance with some embodiments of the disclosed subject matter, non-transitory computer-readable media containing computer executable instructions that, when executed by a processor, cause the processor to perform a method for protected near-field communications is provided, the method comprising: receiving, from an NFC tag device, a request for an NFC reader device identifier (ID); in response to receiving the request, transmitting the NFC reader device ID to the NFC tag device; receiving, by an NFC reader device, an NFC tag device ID; determining whether the NFC tag device ID matches an NFC tag device ID stored in memory of the NFC reader device; in response to determining that the NFC tag device ID matches the NFC tag device ID stored in the memory of the NFC reader device, transmitting a password to the NFC tag device; receiving, from the NFC tag device, a shared secret; determining whether the received shared secret matches a shared secret stored in the memory of the NFC reader device; and in response to determining that the received shared secret matches the shared secret stored in the memory of the NFC reader device, causing an action to be performed by a device associated with the NFC reader device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for protected near-field communications are provided.

In some embodiments, the mechanisms described herein can be implemented by a Near Field Communications (NFC) tag and an NFC reader. In some embodiments, an NFC tag and an NFC reader can each be any suitable devices that are capable of communicating via an NFC protocol. For example, in some embodiments, an NFC tag can be an NFC tag that is embedded or positioned in any suitable object or device, such as jewelry or other wearable (e.g., a ring, a watch, a bracelet, and/or any other suitable type of jewelry), a badge, a mobile device (e.g., a mobile phone, a wearable computer, a tablet computer, a laptop computer, and/or any other suitable type of mobile device and/or any suitable type of computing device), and/or any other suitable object or device. As another example, in some embodiments, an NFC reader can be any suitable device that is capable of receiving information from an NFC tag and performing an action based on the received information. As a more particular example, in some embodiments, an NFC reader can be connected in any suitable manner to a door lock such that the NFC reader, in response to receiving information from the NFC tag, causes the door lock to be locked or unlocked. In some embodiments, the mechanisms described herein can cause an NFC tag and an NFC reader to perform a series of communications such that the NFC tag and the NFC reader are identified and authenticated to each other prior to the NFC reader causing an action to be performed, such as shown in and described below in connection with FIG. 1.

In some embodiments, the mechanisms described herein can cause an NFC tag and an NFC reader to be paired such that the NFC tag stores an NFC reader identifier (ID) (e.g., a unique identifier of the NFC reader, and/or any other suitable ID), and the NFC reader stores an NFC tag ID (e.g., a unique identifier of the NFC tag, and/or any other suitable ID). Furthermore, in some embodiments, during a pairing process, an NFC tag and an NFC reader can each be configured to store a password and a randomly generated shared secret. Note that, in some embodiments, an NFC tag and an NFC reader can each store any suitable information (e.g., identifying information, a shared secret, and/or any other suitable information) in protected memory, which can be accessed using a password.

In some embodiments, the mechanisms described herein can cause a sequence of communications to be transmitted between an NFC tag and an NFC reader such that each of the NFC tag and the NFC reader are identified and authenticated prior to an action being performed by the NFC reader. For example, in some embodiments, in response to detecting that an NFC tag is within proximity of an NFC reader, the NFC reader can transmit an NFC reader ID. Continuing with this example, in some embodiments, the NFC tag can verify that the received NFC reader ID matches an NFC reader ID stored on the NFC tag during a pairing process, and, in response to verifying that the received NFC reader ID matches the stored NFC reader ID, can transmit the NFC tag ID. Continuing further with this example, in some embodiments, the NFC reader can verify that the received NFC tag ID matches an NFC tag ID stored on the NFC reader during the pairing process, and, in response to verifying the NFC tag ID, can transmit a password stored on the NFC reader during the pairing process. Continuing still further with this example, in some embodiments, the NFC tag can, in response to receiving the password, transmit a shared secret stored on the NFC tag during the paring process. Continuing still further with this example, in some embodiments, the NFC reader can verify whether the shared secret matches a shared secret stored on the NFC reader during the pairing process, and, in response to verifying the shared secret, can cause an action associated with the NFC reader to be performed, such as actuating a door lock associated with the NFC reader.

In some embodiments, by causing an NFC tag to transmit identifying information in response to verifying an identity of an NFC reader within proximity of the NFC tag, the NFC tag can verify an identity of the NFC reader prior to transmitting identifying information. Moreover, by causing an NFC tag to additionally transmit a secret shared with the NFC reader prior to the NFC reader performing an action, the NFC tag and the NFC reader can be mutually authenticated prior to the action being taken. Note that, in some embodiments, various benefits may be provided by the mechanisms described herein. For example, in some embodiments, because of multiple messages transmitted between an NFC tag and an NFC reader, cloning of the NFC tag may require multiple interactions with both the NFC tag and the NFC reader. Additionally, in some embodiments, the mechanisms described herein may prevent a Break Once Run Everywhere (BORE) attack.

Note that, in some embodiments, any communications between an NFC tag and an NFC reader can be encrypted in any suitable manner and/or using any suitable technique(s), such as Public Key Infrastructure (PKI) encryption, any suitable symmetric encryption algorithm(s), and/or using any other suitable technique(s).

Figure 1:
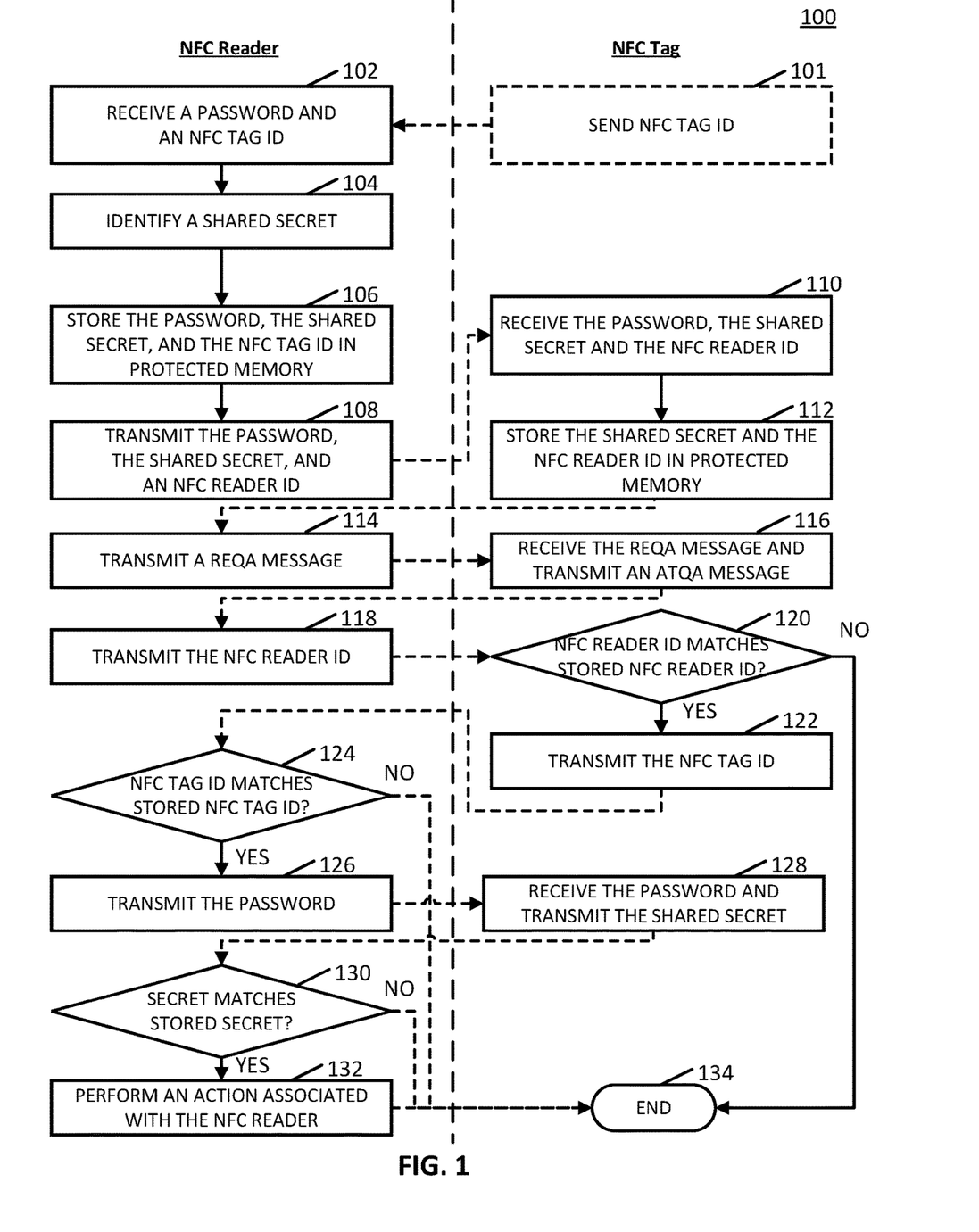
FIG. 1 shows an example information flow diagram for protected NFC communications between an NFC reader and an NFC tag in accordance with some embodiments of the disclosed subject matter.

Turning to FIG. 1, an example 100 of an information flow diagram for implementing protected NFC communications is shown in accordance with some embodiments of the disclosed subject matter. As illustrated, in some embodiments, process 100 can be executed on an NFC reader and/or an NFC tag. In some embodiments, the NFC reader can be any suitable device capable of utilizing an NFC protocol and that can perform an action in response to verifying an identity of the NFC tag device. For example, in some embodiments, the NFC reader can be associated with any suitable device that can actuate a door lock such that the door lock is unlocked in response to the NFC reader verifying an identity of the NFC tag. In some embodiments the NFC tag can be any suitable device capable of communicating using an NFC protocol to transmit an identity of the NFC tag device, such as a badge, a card, a wearable device (e.g., a ring, a watch, a bracelet, etc.), a mobile device (e.g., a mobile phone, a tablet computer, a wearable computer, a laptop computer, and/or any other suitable type of mobile device and/or computing device), and/or any other suitable type of device.

Note that, in some embodiments, the NFC reader and the NFC tag can each be assigned a unique identifier, referred to herein as NFC reader ID and NFC tag ID, respectively. In some embodiments, the unique identifier can be assigned by any suitable entity, such as a manufacturer of the NFC reader and/or the NFC tag.

Additionally, note that blocks 102-112 of process 100 describe techniques through which the NFC reader and the NFC tag can be initially paired with each other, and blocks 114-134 describe techniques through which the NFC reader device and the NFC tag device can communicate after being paired.

At 102, the NFC reader can receive a password and an identifier of the NFC tag, the NFC tag ID. In some embodiments, the NFC reader can receive the password and the identifier in any suitable manner. For example, in some embodiments, the NFC reader can receive a password from a user of the NFC reader in any suitable manner, such as via a keyboard or keypad associated with the NFC reader, a microphone associated with the NFC reader, an application running on a mobile device that is in communication with the NFC reader, and/or in any other suitable manner. In some embodiments, the NFC reader can receive the NFC tag ID in any suitable manner. For example, in some embodiments, the NFC tag can be brought within a proximity range of the NFC reader such that the NFC tag broadcasts the NFC tag ID at 101, and the NFC reader can receive the NFC tag ID. As another example, in some embodiments, the NFC reader can receive the NFC tag ID via a keyboard or keypad associated with the NFC reader, a microphone associated with the NFC reader, an application running on a mobile device that is in communication with the NFC reader, and/or in any other suitable manner.

At 104, the NFC reader can identify a shared secret. In some embodiments, the shared secret can be any suitable randomly generated code of any suitable length. For example, in some embodiments, the shared secret can be generated from a string of alphanumeric characters using a Password Based Key Derivation Function (PBKDF).

In some embodiments, the shared secret can be a factory-set code that is stored in memory of the NFC reader. In some embodiments, the shared secret can be generated during pairing in any suitable manner, such as using a PBKDF. In some embodiments, the shared secret can be stored in the protected memory of the NFC reader. Note that, in some embodiments, the shared secret can be unique to the NFC reader.

At 106, the NFC reader can store the password, the shared secret, and the NFC tag ID in memory of the NFC reader. In some embodiments, the memory can be any suitable type of memory, such as electrically-erasable programmable read-only memory (EEPROM), and/or any other suitable type of memory. In some embodiments, the memory can be protected memory. Note that, in some embodiments, the protected memory can be configured such that the protected memory is accessed using the password.

At 108, the NFC reader can transmit the password, the shared secret, and a unique NFC reader identifier (ID) to the NFC tag. In some embodiments, the NFC reader can transmit the password, the shared secret, and the NFC reader ID to the NFC tag in any suitable manner. For example, in some embodiments, the NFC reader can transmit the password, the shared secret, and the NFC reader ID to the NFC tag using any suitable NFC communication protocol(s). As a more particular example, in some embodiments, the NFC reader can, in response to detecting that the NFC tag is within a predetermined proximity (e.g., 2 cm, 5 cm, and/or any other suitable proximity) of the NFC reader, transmit the information using inductive coupling between the NFC reader and the NFC tag using any suitable NFC protocol(s).

Note that, in some embodiments, the NFC reader ID can be stored in any suitable memory or storage of the NFC reader. For example, in some embodiments, the NFC reader ID can be stored in unprotected memory of the NFC reader that can be accessed without a password. As another example, in some embodiments, the NFC reader ID can be stored in protected memory of the NFC reader.

At 110, the NFC tag can receive the password, the shared secret, and the NFC reader identifier.

At 112, the NFC tag can store the shared secret and the NFC reader ID in memory of the NFC tag. In some embodiments, the memory can be any suitable type of memory, such as EEPROM, and/or any other suitable type of memory. In some embodiments, the memory can be protected memory. In some embodiments, the protected memory can be configured such that the protected memory is accessed using the password received from the NFC reader.

Note that, in some embodiments, after completion of 112 of FIG. 1, the NFC reader and the NFC tag can be considered paired.

At 114, the NFC reader can transmit a Request (REQA) message. In some embodiments, the REQA message can be a message broadcast by the NFC reader that can include any suitable information specified by an NFC communication protocol used by the NFC reader. For example, in some embodiments, the REQA message can include information that indicates specification or configuration information associated with an NFC circuit used by the NFC reader. As another example, in some embodiments, the REQA message can indicate a communication protocol used by the NFC reader. In some embodiments, the NFC reader can transmit the REQA message repeatedly at any suitable interval (e.g., once per second, once per minute, and/or any other suitable interval) until a response is received from the NFC tag, such as described below in connection with 116.

At 116, the NFC tag can receive the REQA message and can transmit an Answer to Request (ATQA) message in response to receiving the REQA message. In some embodiments, the ATQA message can include any suitable information. For example, in some embodiments, the ATQA message can include information that indicates specification or configuration information associated with an NFC circuit used by the NFC tag. As another example, in some embodiments, the ATQA message can indicate a communication protocol used by the NFC tag. As yet another example, in some embodiments, the ATQA message can include a request from the NFC tag for the NFC reader ID.

At 118, in response to receiving the ATQA message, the NFC reader can transmit the NFC reader ID. In some embodiments, the NFC reader can transmit the NFC reader ID in any suitable manner. For example, in some embodiments, the NFC reader can transmit the NFC reader ID using any suitable NFC protocol(s) used by the NFC reader.

At 120, the NFC tag can receive the NFC reader ID and can determine whether the NFC reader ID matches the NFC reader ID stored in the memory of the NFC tag.

If, at 120, the NFC tag determines that the received NFC reader ID does not match the NFC reader ID stored in the memory of the NFC tag ("no" at 120), the NFC tag can end at 134.

If, at 120, the NFC tag determines that the received NFC reader ID matches the NFC reader ID stored in the protected memory of the NFC tag ("yes" at 120), the NFC tag can, at 122, transmit the NFC tag ID. In some embodiments, the NFC tag can transmit the NFC tag ID in any suitable manner. For example, in some embodiments, the NFC tag can transmit the NFC tag ID using any suitable NFC protocol(s) used by the NFC tag.

At 124, the NFC reader can receive the NFC tag ID, and can determine whether the NFC tag ID matches the NFC tag ID stored in the protected memory of the NFC reader.

If, at 124, the NFC reader determines that the received NFC tag ID does not match the NFC tag ID stored in the protected memory of the NFC reader ("no" at 124), the NFC reader can end at 134.

If, at 124, the NFC reader determines that the received NFC tag ID matches the NFC tag ID stored in the memory of the NFC reader ("yes" at 124), the NFC reader can transmit the password at 126. In some embodiments, the NFC reader can transmit the password in any suitable manner. For example, in some embodiments, the NFC reader can transmit the password using any suitable NFC protocol(s) used by the NFC reader.

At 128, the NFC tag can receive the password and can transmit the shared secret. In some embodiments, the NFC tag can use the received password to access the memory in which the shared secret is stored on the NFC tag. In some such embodiments, the NFC tag can retrieve the shared secret from the memory prior to transmitting the shared secret. Additionally, note that, in some embodiments, the NFC tag can determine whether the received password matches a password stored in memory (e.g., a protected memory, and/or any other suitable memory) of the NFC tag prior to transmitting the shared secret. In some embodiments, the NFC tag can transmit the shared secret in any suitable manner. For example, in some embodiments, the NFC tag can transmit the shared secret using any suitable NFC protocol(s) used by the NFC tag.

At 130, the NFC reader can receive the shared secret and can determine whether the shared secret matches the shared secret stored in the memory of the NFC reader.

If, at 130, the NFC reader determines that the shared secret does not match the shared secret stored in the memory of the NFC reader ("no" at 130), the NFC reader can end at 134.

If, at 130, the NFC reader determines that the shared secret matches the shared secret stored in the memory of the NFC reader ("yes" at 130), the NFC reader can perform an action associated with the NFC reader at 132. In some embodiments, the action can be any suitable action. For example, in some embodiments, in an instance in which the NFC reader is connected to a door lock (e.g., via a servomotor that actuates the door lock, and/or in any other suitable manner), the NFC reader can cause the door lock to be unlocked or locked.

Note that, in some embodiments, any information transmitted between the NFC reader and the NFC tag can be encrypted in any suitable manner and using any suitable protocol(s). For example, in some embodiments, information transmitted between the NFC reader and the NFC tag can be encrypted using any suitable symmetric encryption algorithm, where a shared key is stored by both the NFC reader and the NFC tag that is used for both encryption and decryption. In some such embodiments, the shared key can be any suitable key. For example, in some embodiments, the shared key can be the shared secret, such as described above in connection with 104. As another example, in some embodiments, information transmitted between the NFC reader and the NFC tag can be encrypted using PKI encryption. As a more particular example, in some embodiments, the NFC reader and the NFC tag can exchange public keys during a pairing process of the NFC reader and the NFC tag, and the public keys can then be used for encryption and/or decryption of any suitable information. Note that, in some such embodiments, PKI keys (e.g., a public PKI key and/or a private PKI key) can be factory-set on each of the NFC reader and the NFC tag.

In some embodiments, any suitable information can be encrypted. For example, in some embodiments, the NFC reader ID, transmitted from the NFC reader to the NFC tag such as described above in connection with 118, can be encrypted. As another example, in some embodiments, the NFC tag ID, transmitted form the NFC tag to the NFC reader such as described above in connection with 122, can be encrypted. As yet another example, in some embodiments, the password, transmitted from the NFC reader to the NFC tag such as described above in connection with 126, can be encrypted. As still another example, in some embodiments, the shared secret can be encrypted. As a more particular example, in some embodiments, the shared secret can be encrypted using PKI encryption prior to transmission by the NFC reader to the NFC tag (such as described above in connection with 108). Continuing with this particular example, in some such embodiments, the shared secret can then be decrypted by the NFC tag. Continuing further with this particular example, in some embodiments, the shared secret can then be used as a symmetric key for encryption of other information transmitted between the NFC reader and the NFC tag.

In some embodiments, a message that includes encrypted information (e.g., an encrypted NFC reader ID, an encrypted NFC tag ID, an encrypted password, an encrypted shared secret, and/or any other suitable encrypted information) can include a nonce. In some embodiments, the nonce can be any suitable randomly generated string of characters or randomly generated number that is generated by a device (e.g., an NFC reader and/or an NFC tag) transmitting a message prior to transmitting the message. For example, in an instance in which the NFC reader transmits an encrypted password to the NFC tag (e.g., at 126 of FIG. 1), the NFC reader can generate a nonce, and can transmit the encrypted password in connection with the nonce to the NFC tag. In some embodiments, the nonce can be included in any suitable manner, such as in a payload of the message. In some embodiments, the nonce can be verified by a device receiving the message in any suitable manner. For example, in some embodiments, a device can verify that a nonce included in a message that includes encrypted information has not previously been used, thereby preventing a replay attack. As a more particular example, in an instance in which the NFC reader receives encrypted information from the NFC tag (e.g., an encrypted NFC tag ID, an encrypted shared secret, and/or any other suitable information) that is transmitted in connection with a nonce, the NFC reader can verify that the nonce was not previously used in connection with a message transmitted by the NFC tag to the NFC reader.

Figure 2:
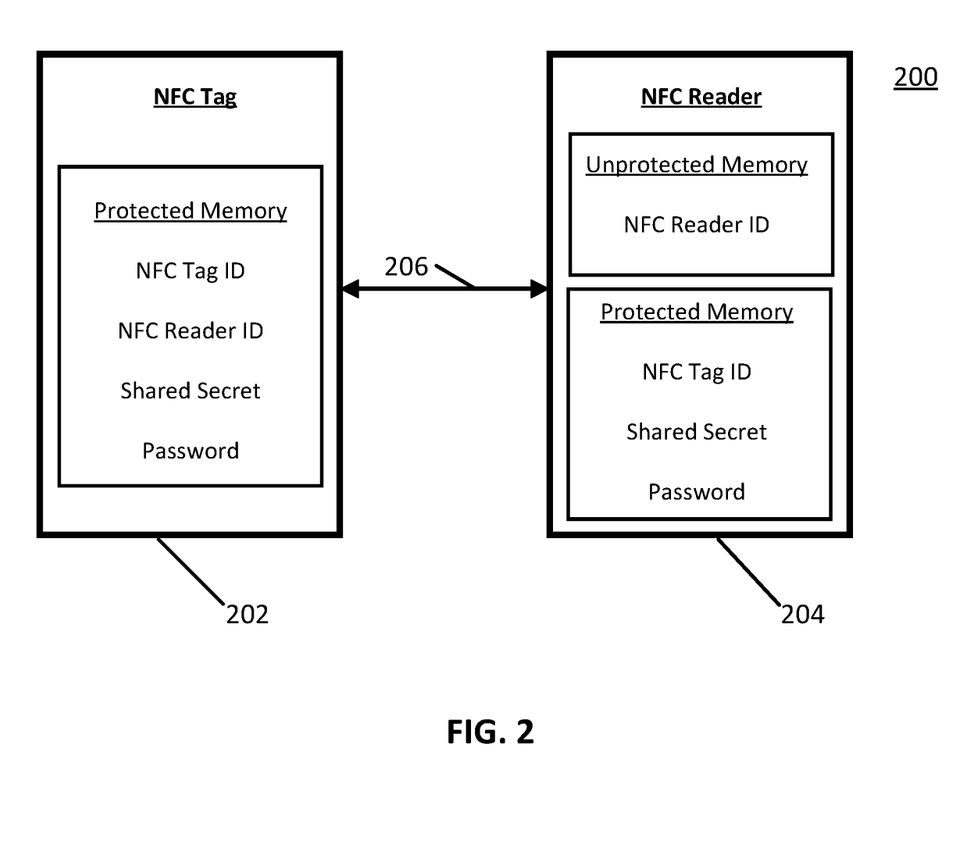
FIG. 2 shows a schematic diagram of an illustrative system suitable for implementation of mechanisms described herein for protected NFC communications in accordance with some embodiments of the disclosed subject matter.

Turning to FIG. 2, an example 200 of hardware for protected NFC communications that can be used in accordance with some embodiments of the disclosed subject matter is shown. As illustrated, hardware 200 can include an NFC tag 202 and an NFC reader 204.

In some embodiments, NFC tag 202 can be any suitable type of device that can transmit and/or receive messages or signals using an NFC protocol. For example, in some embodiments, NFC tag 202 can be a badge, a card, a wearable device (e.g., a ring, a watch, a bracelet, and/or any other suitable wearable device), a mobile device (e.g., a mobile phone, a tablet computer, a laptop computer, and/or any other suitable type of mobile device and/or computing device), and/or any other suitable type of device.

Note that, in some embodiments, as shown in FIG. 2, NFC tag 202 can include a protected memory. In some embodiments, NFC tag 202 can store any suitable information in the protected memory, such as an NFC tag ID, an NFC reader ID corresponding to NFC reader 204 which NFC tag 202 has been previously paired with, a shared secret shared with NFC reader 204, and/or any other suitable information.

In some embodiments, NFC reader 204 can be any suitable type of device that can transmit and/or receive message or signals using an NFC protocol and can perform an action based on information received from NFC tag 202. For example, in some embodiments, NFC reader 204 can be a reader device connected in any suitable manner to a door lock.

Note that, in some embodiments, as shown in FIG. 2, NFC reader 204 can include unprotected memory and protected memory. In some embodiments, NFC reader 204 can store any suitable information in the unprotected memory, such as an NFC reader ID. In some embodiments, NFC reader 204 can store any suitable information in the protected memory, such as an NFC tag ID corresponding to NFC tag 202 which NFC reader 204 has been previously paired with, a shared secret with NFC tag 202, and/or any other suitable information.

In some embodiments, NFC tag 202 and NFC reader 204 can communicate via communications link 206. In some embodiments, communications link 206 can be any suitable communications link that allows NFC tag 202 and NFC reader 204 to communicate via an NFC protocol. For example, in some embodiments, communications link 206 can allow NFC tag device 202 and NFC reader device 204 to communicate via inductive coupling.

Although one each of NFC tag 202 and NFC reader 204 are shown in FIG. 2, in some embodiments, and/or any suitable types of NFC devices of any suitable type(s), can be used in some embodiments.

NFC tag 202 and NFC reader 204 can be implemented using any suitable hardware in some embodiments. For example, in some embodiments, NFC tag 202 and NFC reader 204 can be implemented using any suitable general-purpose computer or special-purpose computer. For example, in some embodiments, a mobile phone that includes an NFC reader may be implemented using a special-purpose computer. Any such general-purpose computer or special-purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Figure 3:
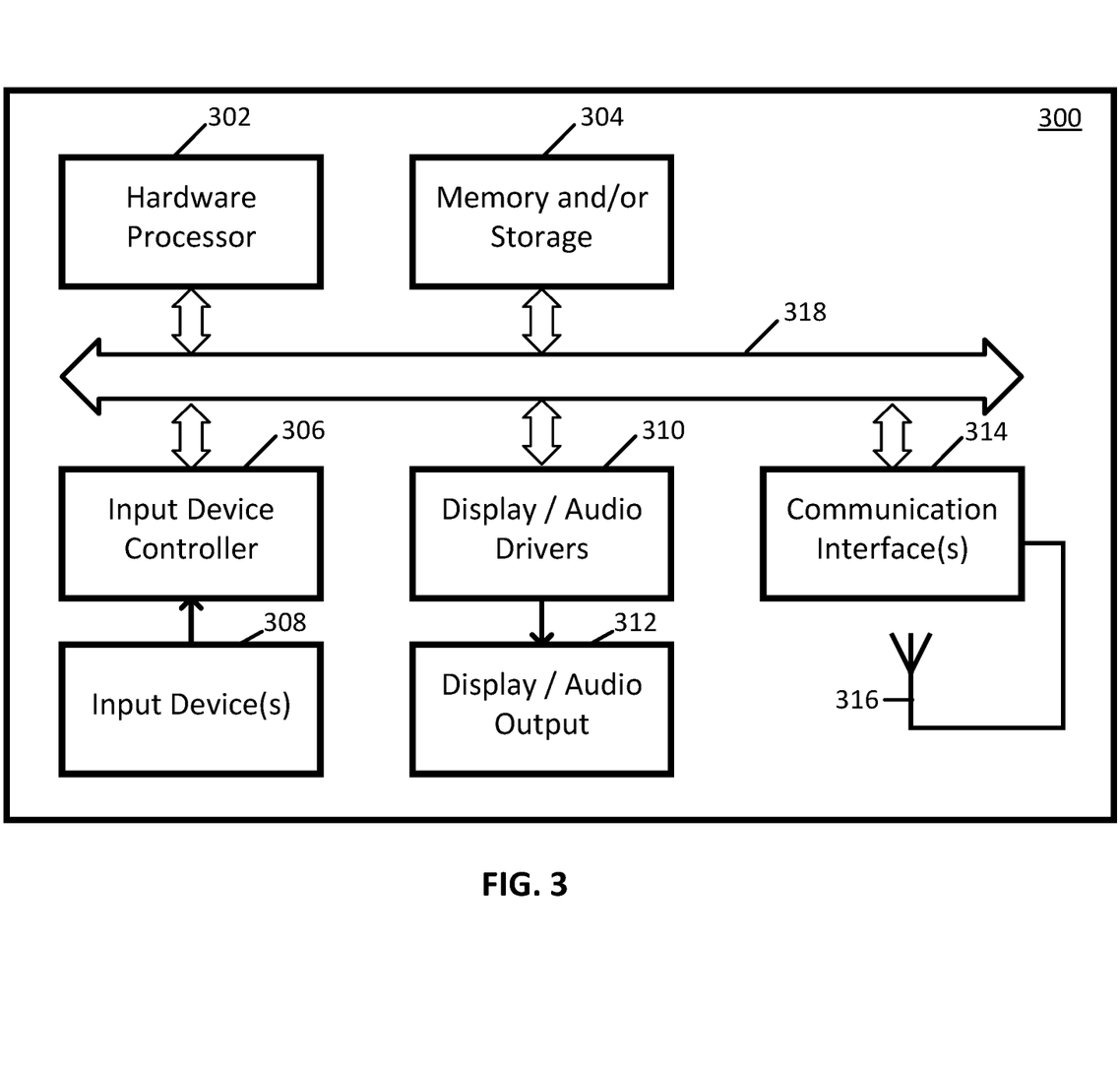
FIG. 3 shows a detailed example of hardware that can be used in a server and/or a user device of FIG. 2 in accordance with some embodiments of the disclosed subject matter.

Hardware processor 302 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 302 can be controlled by a computer program stored in memory and/or storage of a device, such as one of NFC tag 202 and/or NFC reader 204.

Memory and/or storage 304 can be any suitable memory and/or storage for storing programs, data, and/or any other suitable information in some embodiments. For example, memory and/or storage 304 can include random access memory, read-only memory, flash memory, hard disk storage, optical media, and/or any other suitable memory. Note that, in some embodiments, memory and/or storage 304 can include protected memory and non-protected memory. For example, in some embodiments, protected information, such as a password, a device identifier, a shared secret, and/or any other suitable protected information can be stored in a protected memory of memory and/or storage 304 of NFC tag 202 and/or NFC reader 204.

Input device controller 306 can be any suitable circuitry for controlling and receiving input from one or more input devices 308 in some embodiments. For example, input device controller 306 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks. For example, interface(s) 314 can include any suitable NFC interfaces, network interface card circuitry, wireless communication circuitry, and/or any other suitable type of communication network circuitry.

Antenna 316 can be any suitable one or more antennas for wirelessly communicating with a communication network in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 300 in accordance with some embodiments.

In some embodiments, at least some of the above described blocks of the process of FIG. 1 can be executed or performed in any order or sequence not limited to the order and sequence shown in and described in connection with the figures. Also, some of the above blocks of FIG. 1 can be executed or performed substantially simultaneously where appropriate or in parallel to reduce latency and processing times. Additionally or alternatively, some of the above described blocks of the process of FIG. 1 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for protected near-field communications are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for protected near-field communications, comprising:
   receiving, by an NFC reader device, an NFC tag device ID of an NFC tag device;
   determining whether the received NFC tag device ID matches an NFC tag device ID stored in memory of the NFC reader device;
   in response to determining that the received NFC tag device ID matches the NFC tag device ID stored in the memory of the NFC reader device, transmitting a password to the NFC tag device;
   receiving, from the NFC tag device, a shared secret;
   determining whether the received shared secret matches a shared secret stored in the memory of the NFC reader device; and
   in response to determining that the received shared secret matches the shared secret stored in the memory of the NFC reader device, causing an action to be performed by a device associated with the NFC reader device.

2. The method of claim 1, further comprising:
   associating, by the NFC reader device, the NFC reader device with the NFC tag device, wherein associating the NFC reader device with the NFC tag device comprises:
      transmitting the password, the shared secret, and the NFC reader device ID to the NFC tag device; and
      storing the NFC tag device ID and the shared secret in memory of the NFC reader device.

3. The method of claim 1, wherein the memory of the NFC reader device is protected memory.

4. The method of claim 1, wherein the device associated with the NFC reader device is a door lock.

5. The method of claim 1, wherein the NFC tag device is associated with a mobile phone.

6. The method of claim 1, wherein transmitting the password to the NFC tag device comprises:
   encrypting the password using the shared secret; and
   transmitting the encrypted password, the NFC reader device ID, and a nonce to the NFC tag device.

7. The method of claim 1, further comprising:
   decrypting the shared secret received from the NFC tag device; and
   verifying a nonce received in connection with the shared secret, wherein the shared secret received from the NFC tag device is encrypted and is received in connection with the NFC tag device ID and a nonce transmitted from the NFC tag device.

8. A system for protected near-field communications, the system comprising:
   a memory; and
   a hardware processor coupled to the memory that is programmed to:
      receive, by an NFC reader device, an NFC tag device ID of an NFC tag device;
      determine whether the received NFC tag device ID matches an NFC tag device ID stored in memory of the NFC reader device;
      in response to determining that the received NFC tag device ID matches the NFC tag device ID stored in the memory of the NFC reader device, transmit a password to the NFC tag device;
      receive, from the NFC tag device, a shared secret;
      determine whether the received shared secret matches a shared secret stored in the memory of the NFC reader device; and
      in response to determining that the received shared secret matches the shared secret stored in the memory of the NFC reader device, cause an action to be performed by a device associated with the NFC reader device.

9. The system of claim 8, wherein the hardware processor is further programmed to:
   associate, by the NFC reader device, the NFC reader device with the NFC tag device, wherein associating the NFC reader device with the NFC tag device comprises:
      transmitting the password, the shared secret, and the NFC reader device ID to the NFC tag device; and
      storing the NFC tag device ID and the shared secret in memory of the NFC reader device.

10. The system of claim 8, wherein the memory of the NFC reader device is protected memory.

11. The system of claim 8, wherein the device associated with the NFC reader device is a door lock.

12. The system of claim 8, wherein the NFC tag device is associated with a mobile phone.

13. The system of claim 8, wherein transmitting the password to the NFC tag device comprises:
   encrypting the password using the shared secret; and
   transmitting the encrypted password, the NFC reader device ID, and a nonce to the NFC tag device.

14. The system of claim 8, wherein the hardware processor is further programmed to:
   decrypt the shared secret received from the NFC tag device; and
   verify a nonce received in connection with the shared secret, wherein the shared secret received from the NFC tag device is encrypted and is received in connection with the NFC tag device ID and a nonce transmitted from the NFC tag device.

15. A non-transitory computer-readable medium containing computer executable instructions that, when executed by a processor, cause the processor to perform a method for protected near-field communications, the method comprising:
   receiving, by an NFC reader device, an NFC tag device ID of an NFC tag device;
   determining whether the received NFC tag device ID matches an NFC tag device ID stored in memory of the NFC reader device;
   in response to determining that the received NFC tag device ID matches the NFC tag device ID stored in the memory of the NFC reader device, transmitting a password to the NFC tag device;
   receiving, from the NFC tag device, a shared secret;
   determining whether the received shared secret matches a shared secret stored in the memory of the NFC reader device; and
   in response to determining that the received shared secret matches the shared secret stored in the memory of the NFC reader device, causing an action to be performed by a device associated with the NFC reader device.

16. The non-transitory computer-readable medium of claim 15, wherein the method further comprises:
   associating, by the NFC reader device, the NFC reader device with the NFC tag device, wherein associating the NFC reader device with the NFC tag device comprises:
      transmitting the password, the shared secret, and the NFC reader device ID to the NFC tag device; and
      storing the NFC tag device ID and the shared secret in memory of the NFC reader device.

17. The non-transitory computer-readable medium of claim 15, wherein the memory of the NFC reader device is protected memory.

18. The non-transitory computer-readable medium of claim 15, wherein the device associated with the NFC reader device is a door lock.

19. The non-transitory computer-readable medium of claim 15, wherein the NFC tag device is associated with a mobile phone.

20. The non-transitory computer-readable medium of claim 15, wherein transmitting the password to the NFC tag device comprises:
- encrypting the password using the shared secret; and
- transmitting the encrypted password, the NFC reader device ID, and a nonce to the NFC tag device.

21. The non-transitory computer-readable medium of claim 15, wherein the method further comprises:
- decrypting the shared secret received from the NFC tag device; and
- verifying a nonce received in connection with the shared secret, wherein the shared secret received from the NFC tag device is encrypted and is received in connection with the NFC tag device ID and a nonce transmitted from the NFC tag device.

* * * * *